US012589680B2

(12) United States Patent
Lin et al.

(10) Patent No.: US 12,589,680 B2
(45) Date of Patent: Mar. 31, 2026

(54) MOUNTING STRUCTURE OF SEAT FOR ALL TERRAIN VEHICLE

(71) Applicants: Weiwei Lin, Taizhou City (CN);
Dongdong Chen, Taizhou City (CN);
Nenghao Chen, Taizhou City (CN)

(72) Inventors: Weiwei Lin, Taizhou City (CN);
Dongdong Chen, Taizhou City (CN);
Nenghao Chen, Taizhou City (CN)

(73) Assignee: Zhejiang Qianjiang Motorcycle Co., Ltd., Taizhou City (CN)

( * ) Notice: Subject to any disclaimer, the term of this patent is extended or adjusted under 35 U.S.C. 154(b) by 307 days.

(21) Appl. No.: 18/463,600

(22) Filed: Sep. 8, 2023

(65) Prior Publication Data

US 2024/0399942 A1 Dec. 5, 2024

(30) Foreign Application Priority Data

May 30, 2023 (CN) .......................... 202310631890.5

(51) Int. Cl.
B60N 2/38 (2006.01)
B60N 2/06 (2006.01)

(52) U.S. Cl.
CPC .............. B60N 2/38 (2013.01); B60N 2/062 (2013.01)

(58) Field of Classification Search
CPC .......... B60N 2/38; B60N 2/062; B60N 2/015;
B60N 2/24; B60N 2/01575; B60N
2/01516; B60N 2/01541; B60N 2/0155;
B60N 2/01583

USPC ........................................................ 297/344.1
See application file for complete search history.

(56) References Cited

U.S. PATENT DOCUMENTS

| | | | | | |
|---|---|---|---|---|---|
| 1,957,004 | A | * | 5/1934 | Smith ...................... | B60N 2/10 5/55.1 |
| 3,915,493 | A | * | 10/1975 | Brown ................. | B60N 2/0155 292/87 |
| 3,961,767 | A | * | 6/1976 | Albrecht ............... | B60N 2/015 248/503.1 |
| 4,742,984 | A | * | 5/1988 | Cote ...................... | B60N 2/015 297/440.22 |

(Continued)

FOREIGN PATENT DOCUMENTS

| | | | | | |
|---|---|---|---|---|---|
| CN | 206528379 | U | * | 9/2017 | ............... B60N 2/38 |
| CN | 107351733 | A | * | 11/2017 | ............... B60N 2/38 |

(Continued)

*Primary Examiner* — James M Ference
(74) *Attorney, Agent, or Firm* — Minder Law Group;
Willy H. Wong

(57) ABSTRACT

A mounting structure of a seat for an all terrain vehicle with a vehicle frame and a seat frame, at least one insertion rod is provided at a bottom of the seat frame in a front-and-rear direction, with a rear end of the insertion rod being in snap-fitting engagement with the vehicle frame, the mounting structure comprises a guide carrier fixedly provided on the vehicle frame and having a socket at a rear side of the guide carrier capable of inserting a front end of the insertion rod, with a width of the socket in a left-and-right direction gradually increasing from front to rear, so that the front end of the insertion rod is positioned in an up-and-down direction by snap-fitting engagement into the guide carrier and limited in the left-and-right direction by engagement between inner walls of the guide carrier.

9 Claims, 9 Drawing Sheets

(56) References Cited

U.S. PATENT DOCUMENTS

| | | | | |
|---|---|---|---|---|
| 4,759,580 | A * | 7/1988 | Berklich, Jr. | B60N 2/01583 |
| | | | | 297/336 |
| 4,805,952 | A * | 2/1989 | Coleman | B60N 2/38 |
| | | | | 296/65.03 |
| 4,888,854 | A * | 12/1989 | Russell | E05D 7/1061 |
| | | | | 296/65.09 |
| 5,038,437 | A * | 8/1991 | Russell | B60N 2/01575 |
| | | | | 297/378.12 |
| 5,496,088 | A * | 3/1996 | Stewart | B60N 2/01583 |
| | | | | 297/336 |
| 5,547,242 | A * | 8/1996 | Dukatz | B60N 2/01583 |
| | | | | 74/543 |
| 5,626,391 | A * | 5/1997 | Miller | B60N 2/206 |
| | | | | 296/65.09 |
| 5,730,480 | A * | 3/1998 | Takamura | B60N 2/01583 |
| | | | | 292/341.12 |
| 5,975,611 | A * | 11/1999 | Hoshihara | B60N 2/305 |
| | | | | 297/336 |
| 6,155,626 | A * | 12/2000 | Chabanne | B60N 2/305 |
| | | | | 297/130 |
| 6,375,245 | B1 * | 4/2002 | Seibold | B60N 2/01583 |
| | | | | 297/336 |
| 6,994,391 | B2 * | 2/2006 | Lutzka | B60N 2/01516 |
| | | | | 296/65.03 |
| 8,905,469 | B2 * | 12/2014 | Kurachi | B60N 2/3043 |
| | | | | 297/14 |
| 10,773,622 | B2 * | 9/2020 | Zou | B60N 2/503 |
| 11,312,275 | B2 * | 4/2022 | Zou | B60N 2/38 |
| 11,390,188 | B2 | 7/2022 | Tachikawa | |
| 11,447,040 | B2 * | 9/2022 | Brown | B60N 2/38 |
| 2006/0097507 | A1 * | 5/2006 | Toyota | B60K 15/063 |
| | | | | 280/834 |
| 2015/0136934 | A1 * | 5/2015 | Gordeenko | B60N 2/366 |
| | | | | 248/503.1 |
| 2016/0221471 | A1 * | 8/2016 | Kamara | B60N 2/206 |
| 2017/0174101 | A1 * | 6/2017 | Gebauer | B60N 2/01516 |
| 2018/0304939 | A1 * | 10/2018 | Storhaug | B60J 1/004 |
| 2019/0061572 | A1 * | 2/2019 | Zou | B60N 2/06 |
| 2019/0061580 | A1 * | 2/2019 | Zou | B60N 2/38 |
| 2020/0262318 | A1 * | 8/2020 | Maeda | B60N 2/38 |
| 2021/0253005 | A1 * | 8/2021 | Satvilkar | F16B 21/073 |
| 2022/0274506 | A1 * | 9/2022 | Tachikawa | B60N 2/366 |
| 2024/0399942 | A1 * | 12/2024 | Lin | B60N 2/38 |
| 2024/0399943 | A1 * | 12/2024 | Lin | B60N 2/542 |

FOREIGN PATENT DOCUMENTS

| | | | | | |
|---|---|---|---|---|---|
| CN | 212979966 | U | * | 4/2021 | B60N 2/06 |
| WO | 0220301 | A1 | | 3/2002 | |
| WO | 2005105512 | A2 | | 11/2005 | |
| WO | WO-2015097470 | A1 | * | 7/2015 | B63B 29/06 |
| WO | 2016066148 | A1 | | 5/2016 | |

* cited by examiner

MOUNTING STRUCTURE OF SEAT FOR ALL TERRAIN VEHICLE

RELATED APPLICATIONS

This application claims priority to Chinese Patent Application No. CN202310631890.5, filed May 30, 2023.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND

Field

The invention belongs to the technical field of driven vehicles and relates to a mounting structure of a seat for an all terrain vehicle.

Related Art

An all terrain vehicle refers to a vehicle that is capable of travelling on any terrain, and capable of travelling freely on terrain where it is difficult for ordinary vehicles to maneuver, commonly known as dune buggy in China. Because its structure is very similar to that of a motorcycle, and many parts are in common with motorcycles, some people also call it "four-wheeled motorcycle". This type of vehicle has a variety of uses and is not limited by road conditions. The seat of the all terrain vehicle is assembled on the vehicle frame during the final assembly stage to stabilize the position of a passenger during driving.

The patent publication number CN107351733A discloses a seat comprising a seat bottom plate, a cushion and a chassis assembly, the cushion is disposed on the seat bottom plate, the seat bottom plate is connected with a vehicle frame through the chassis assembly, and the seat bottom plate is integrally injection molded.

The seat is connected and assembled with the vehicle frame through a detachable structure, but when a bottom of the seat is mounted from the rear to the front, the operator's line of sight is blocked by the seat body, making it difficult to precisely mount the seat in place, which may easily lead to misoperation.

SUMMARY

The invention aims to solve the above-mentioned problems existing in the prior art by providing a mounting structure of a seat for an all terrain vehicle. The technical problem to be solved by the invention is: the existing all terrain vehicle seat is prone to misoperation during mounting.

An object of the invention can be achieved through the following technical solutions.

A mounting structure of a seat for an all terrain vehicle is provided, the all terrain vehicle comprises a vehicle frame and a seat frame, the mounting structure comprises at least one insertion rod provided at a bottom of the seat frame in a front-and-rear direction, with an insertion rod rear end of the at least one insertion rod being in snap-fitting engagement with the vehicle frame, the mounting structure further comprises a guide carrier fixedly provided on the vehicle frame and having a socket at a rear side of the guide carrier capable of inserting an insertion rod front end of the at least one insertion rod, with a width of the socket in a left-and-right direction gradually increasing from front to rear, so that the insertion rod front end is positioned in an up-and-down direction by snap-fitting engagement into the guide carrier and limited in the left-and-right direction by engagement between inner walls of the guide carrier.

The vehicle frame is a main body of the frame for mounting and supporting of vehicle body parts. The seat frame is a supporting frame for the vehicle seat, which is used to support a load of a passenger and ensure a shape of the seat. With the insertion rod rear end of the at least one insertion rod engaging with the vehicle frame, it is convenient to mount and disassemble with a condition that the seat frame and the vehicle frame are stably connected. In the invention, front, rear, left, and right are judged based on front, rear, left, and right sides of the vehicle frame. During a mounting process, the insertion rod rear end of the at least one insertion rod is not engaged with the vehicle frame at first, an operator keeps the seat frame tilted forward from behind and controls the seat frame to move forward, through the guide carrier provided on the vehicle frame and having the socket at the rear side of the guide carrier, and with the width of the socket in the left-and-right direction gradually increasing from front to rear, the insertion rod front end of the at least one insertion rod can be positioned by snap-fitting engagement into the guide carrier and limited in the left-and-right direction by engagement between the inner walls of the guide carrier. It is conducive to increasing the operator's probability of aligning the at least one insertion rod with the guide carrier under a condition of the operator's line of sight being blocked. At the same time, the insertion rod front end of the at least one insertion rod is capable of moving under guidance of the inner walls of the guide carrier and is limited in the left-and-right direction by engagement between the inner walls of the guide carrier when the operator pushes the seat frame to move forward, so that the insertion rod front end of the at least one insertion rod is engaged in the guide carrier to limit an up-and-down position of the insertion rod front end. At this time, the insertion rod rear end of the at least one insertion rod is also in place to enable the operator to press the insertion rod rear end of the at least one insertion rod downward to engage with the vehicle frame to complete mounting of the seat, thereby greatly reducing a probability of misoperation during seat mounting.

In the mounting structure of a seat for an all terrain vehicle, the socket is provided with an internal cavity having a bottom surface inclined downwardly from front to rear. It further increases a coverage of the socket, improves a probability of inserting the insertion rod front end of the at least one insertion rod into the guide carrier during a mounting process, and reduces a probability of misoperation.

In the mounting structure of a seat for an all terrain vehicle, the guide carrier is U-shaped with an opening at top, at least two of the at least one insertion rod are provided and arranged parallel to each other in the left-and-right direction, the mounting structure further comprises a connecting rod provided transversely on the seat frame in the left-and-right direction, and the connecting rod is simultaneously and fixedly connected to a top of each of the insertion rod front ends. Disposition of the insertion rods in cooperating with the connecting rod is conducive to ensuring a connection stability between the seat frame and the vehicle frame. At the same time, the guide carrier with an opening at top is conducive for the operator to adjust a pre-mounting inclination angle of the insertion rods in real time according to situation, under a condition of avoiding interference, thereby improving the convenience of operation.

In the mounting structure of a seat for an all terrain vehicle, a positioning shaft is provided transversely in the left-and-right direction and connected to the guide carrier, an insertion rod front end face of the at least one insertion rod has a positioning recess that extends through both left and right sides of the at least one insertion rod and allows embedding of the positioning shaft within the positioning recess, a bottom face of the at least one insertion rod is disposed to be spaced apart from a bottom surface of an internal cavity of the guide carrier, and a guide surface is provided along an upper edge of the positioning recess capable of guiding the positioning shaft to slide into the positioning recess.

In this way, when the seat frame is mounted, during a process of inserting the downwardly-facing insertion rod front end of the at least one insertion rod into the guide carrier from rear to front, the insertion rod front end of the at least one insertion rod slides forward along the bottom surface of the internal cavity of the guide carrier, and the guide surface is capable of abutting against the positioning shaft when the least one insertion rod is blocked after sliding to reach a position of the positioning shaft. At this time, the operator can press the insertion rod rear end of the at least one insertion rod downward and at the same time apply force to push the seat frame forward, the insertion rod front end of the at least one insertion rod is lifted up under an action of the guide surface, so that the positioning shaft fits into the positioning recess and cannot be pushed further. At the same time, the insertion rod rear end of the at least one insertion rod is pressed downward to be in place to achieve precise engagement between a rear end of the seat frame and the vehicle frame. During a mounting process, the operator is capable of precisely judging the insertion rod front end of the at least one insertion rod being in place after feeling a sliding resistance at the insertion rod front end of the at least one insertion rod and then feeling the insertion rod front end of the at least one insertion rod being lifted up, and then pressing the insertion rod rear end of the at least one insertion rod downward to achieve engagement, thereby ensuring precise mounting and avoiding misjudgment caused by visual blind spots.

In the mounting structure of a seat for an all terrain vehicle, the at least one insertion rod comprises a tubular body provided along the front-and-rear direction and a positioning block detachably connected within a tubular body front end of the tubular body, and the positioning recess being located on the positioning block. In this way, the detachable positioning block is capable of cooperating with the positioning shaft during a mounting process, which is conducive to improving a strength at a fitting position and reducing a cost of subsequent replacement and maintenance.

In the mounting structure of a seat for an all terrain vehicle, a positioning block front end of the positioning block protrudes beyond the tubular body, while a lower edge of the positioning block front end either protrudes beyond a lower edge of the tubular body front end or is flush with the lower edge of the tubular body front end, and the lower edge of the positioning block front end is rounded. In this way, the positioning block is capable of sliding relative to the inner walls of the guide carrier to reduce scratches and avoid damage to the tubular body, and at the same time reduce a resistance during mounting, making mounting convenient.

In the mounting structure of a seat for an all terrain vehicle, the mounting structure further comprises a locking rod provided transversely on the vehicle frame in the left-and-right direction, a locking hook is connected to the at least one insertion rod and capable of swinging in the front-and-rear direction, the locking hook being hooked to the locking rod and being limited in a vertical direction by engagement with a lower side of the locking rod. In this way, the insertion rod rear end of the at least one insertion rod is in snap-fitting engagement with the locking rod of the vehicle frame through the locking hook. During mounting, the operator manipulates the locking hook to swing to realize engagement and dismounting, thereby ensuring a position of the seat frame stable and convenient operation.

In the mounting structure of a seat for an all terrain vehicle, a spring element is provided between the locking hook and the at least one insertion rod, so that the locking hook always has a tendency to swing under an action of the spring element towards a side to which an opening of the locking hook is directed. In this way, after the locking rod is fitted in the locking hook, the locking hook is capable of resetting itself and maintaining a stable locking relationship with the locking rod, which improves the convenience of mounting.

In the mounting structure of a seat for an all terrain vehicle, the locking hook has an arc surface extending from a bottom of the locking hook up to the opening of the locking hook, and the at least one insertion rod has a position limiter capable of abutting against the locking hook to prevent the locking hook from further swinging and to keep the bottom of the locking hook facing downward. In this way, during a mounting process of pressing the insertion rod rear end of the at least one insertion rod downward, the locking hook has not been fitted with the locking rod and abuts against the position limiter. At this time, when the locking hook descends with the insertion rod rear end of the at least one insertion rod to abut against the locking rod, the locking rod is capable of sliding along the arc surface and finally engaging into the opening of the locking hook, the whole process does not need to actively manipulate the locking hook to swing, which makes mounting more convenient.

In the mounting structure of a seat for an all terrain vehicle, a bottom of the at least one insertion rod has an accommodating recess with a downward-facing mouth, so that the locking rod is embedded in the accommodating recess and is limited in the front-and-rear direction by engagement with inner walls of the accommodating recess. In this way, the accommodating recess is capable of limiting relative positions of the seat frame and the locking rod, and ensuring a stable mounting effect. At the same time, the accommodating recess can further be used as a standard for checking whether a position of the at least one insertion rod is in place, that is, after the insertion rod front end of the at least one insertion rod is fitted in place, the insertion rod front end of the at least one insertion rod can be pressed downward to engage the locking rod into the accommodating recess, which is conducive to ensuring precise mounting.

Compared with the prior art, advantages of the invention are as follows.

The mounting structure of a seat for an all terrain vehicle is conducive to increasing the operator's probability of aligning the at least one insertion rod with the guide carrier under a condition of the operator's line of sight being blocked. At the same time, the insertion rod front end of the at least one insertion rod is capable of moving under guidance of the inner walls of the guide carrier to reach a position of being limited by engagement between the inner walls of the guide carrier, so that the insertion rod front end of the at least one insertion rod can be precisely engaged into the guide carrier. At this time, a position of the insertion rod rear end of the at least one insertion rod is also in place to be pressed downward to engage with the vehicle frame to complete mounting of the seat, thereby greatly reducing a probability of misoperation during seat mounting.

DETAILED DESCRIPTION

The technical solutions of the invention are further described below with reference to the specific embodiments of the invention in conjunction with the accompanied drawings, but the invention is not limited to the embodiments.

Figure 1:
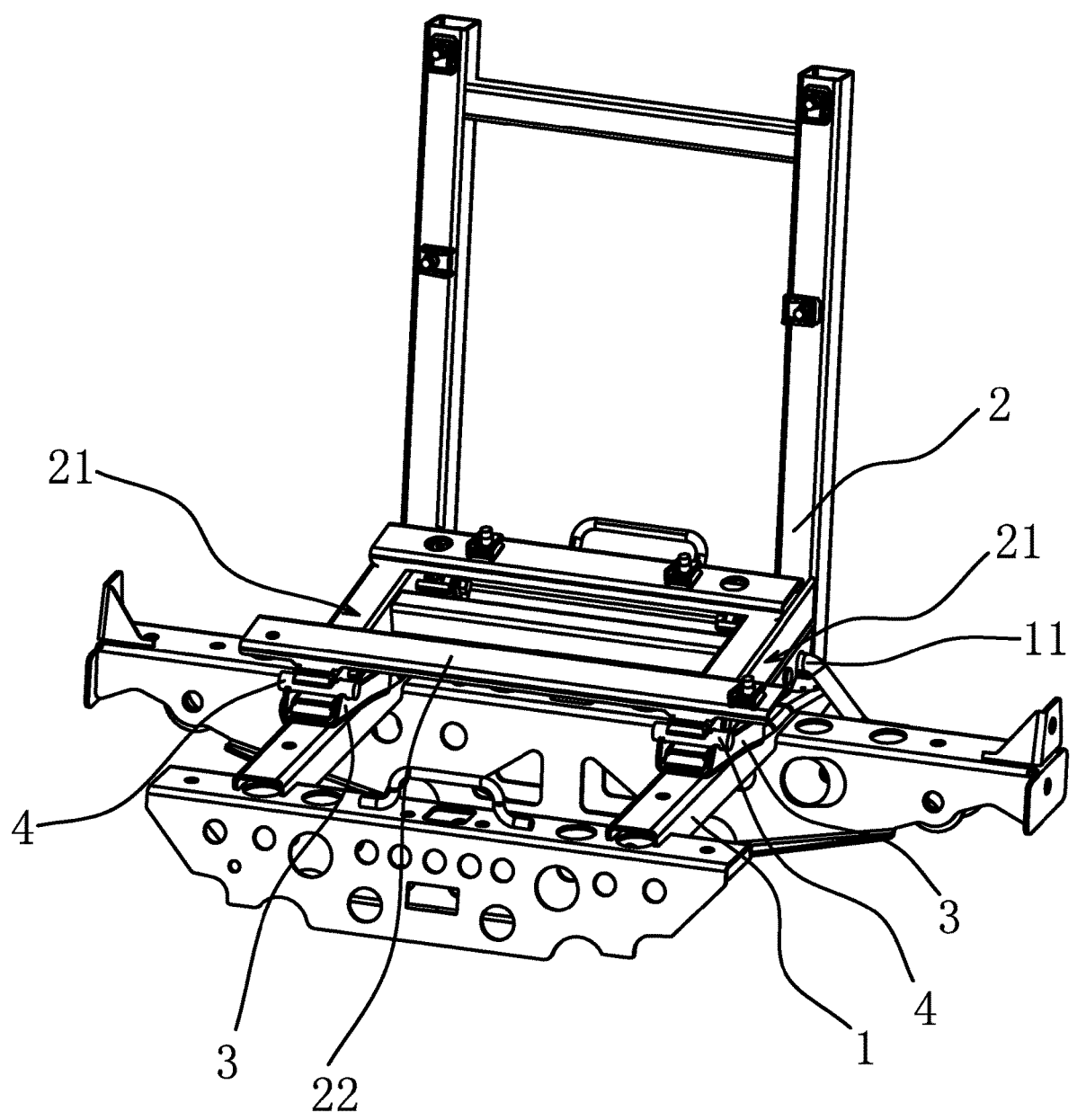
FIG. 1 is a first perspective view of one embodiment of a mounting structure of a seat for an all terrain vehicle.
Figure 2:
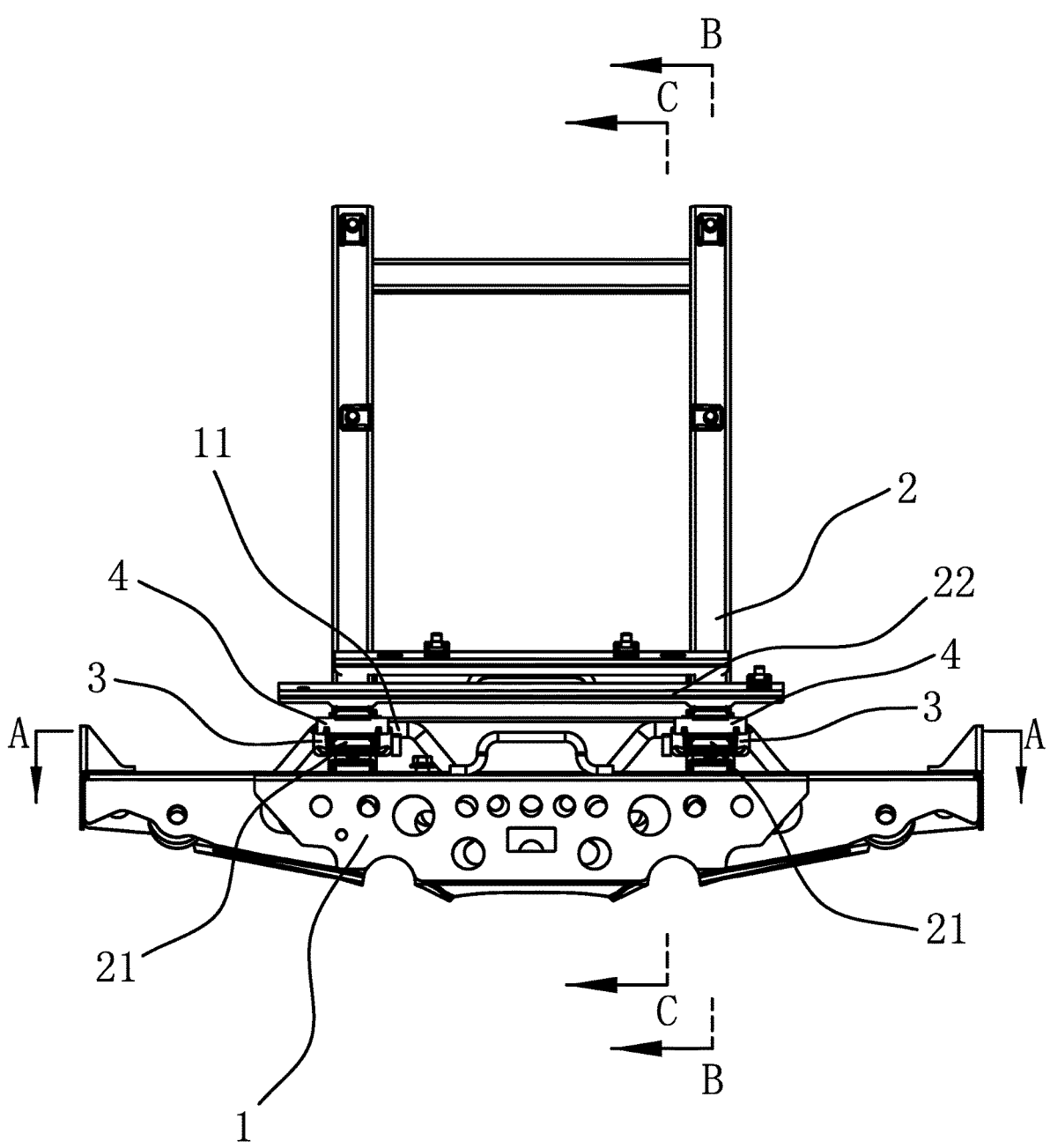
FIG. 2 is a front view of one embodiment of the mounting structure of a seat for an all terrain vehicle.

As shown in FIG. 1 and FIG. 2, in a mounting structure of a seat for an all terrain vehicle, the all terrain vehicle comprises a vehicle frame 1 and a seat frame 2, at least one insertion rod 21 is provided at a bottom of the seat frame 2 and extending in a front-and-rear direction, and an insertion rod rear end of the at least one insertion rod 21 is in snap-fitting engagement with the vehicle frame 1. The mounting structure comprises a guide carrier 3 fixedly provided on the vehicle frame 1, a positioning shaft 4 is provided transversely in the left-and-right direction and fixedly connected to the guide carrier 3 by welding, and an insertion rod front end of the at least one insertion rod 21 is positioned and fitted in a vertical direction with the positioning shaft 4. The vehicle frame 1 is a main body of the frame for mounting and supporting of vehicle body parts. The seat frame 2 is a supporting frame for the vehicle seat, which is used to support a load of a passenger and ensure a shape of the seat. With the insertion rod rear end of the at least one insertion rod 21 engaging with the vehicle frame 1, it is convenient to mount and disassemble with a condition that the seat frame 2 and the vehicle frame 1 are stably connected. The guide carrier 3 is provided on the vehicle frame 1, the positioning shaft 4 disposed transversely in the left-and-right direction is connected in the guide carrier 3, the guide carrier 3 is provided with an opening at top, two of the at least one insertion rod 21 are provided and arranged parallel to each other in the left-and-right direction on two sides of the seat frame 2 respectively, a connecting rod 22 is provided transversely on the seat frame 2 in the left-and-right direction, and the connecting rod 22 is simultaneously and fixedly connected to a top of each of the insertion rod front ends of the two insertion rods 21. Disposition of the insertion rods 21 in cooperating with the connecting rod 22 is conducive to ensuring a connection stability between the seat frame 2 and the vehicle frame 1. At the same time, the guide carrier 3 with an opening at top is conducive for an operator to adjust a prior-to-mounting inclination angle of the insertion rods 21 in real time according to situation, under a condition of avoiding interference, thereby improving the convenience of operation. A locking rod 11 is provided transversely on the vehicle frame 1 in the left-and-right direction, and the locking rod 11 is in snap-fitting engagement with the insertion rod rear end of the at least one insertion rod 21.

Figure 3:
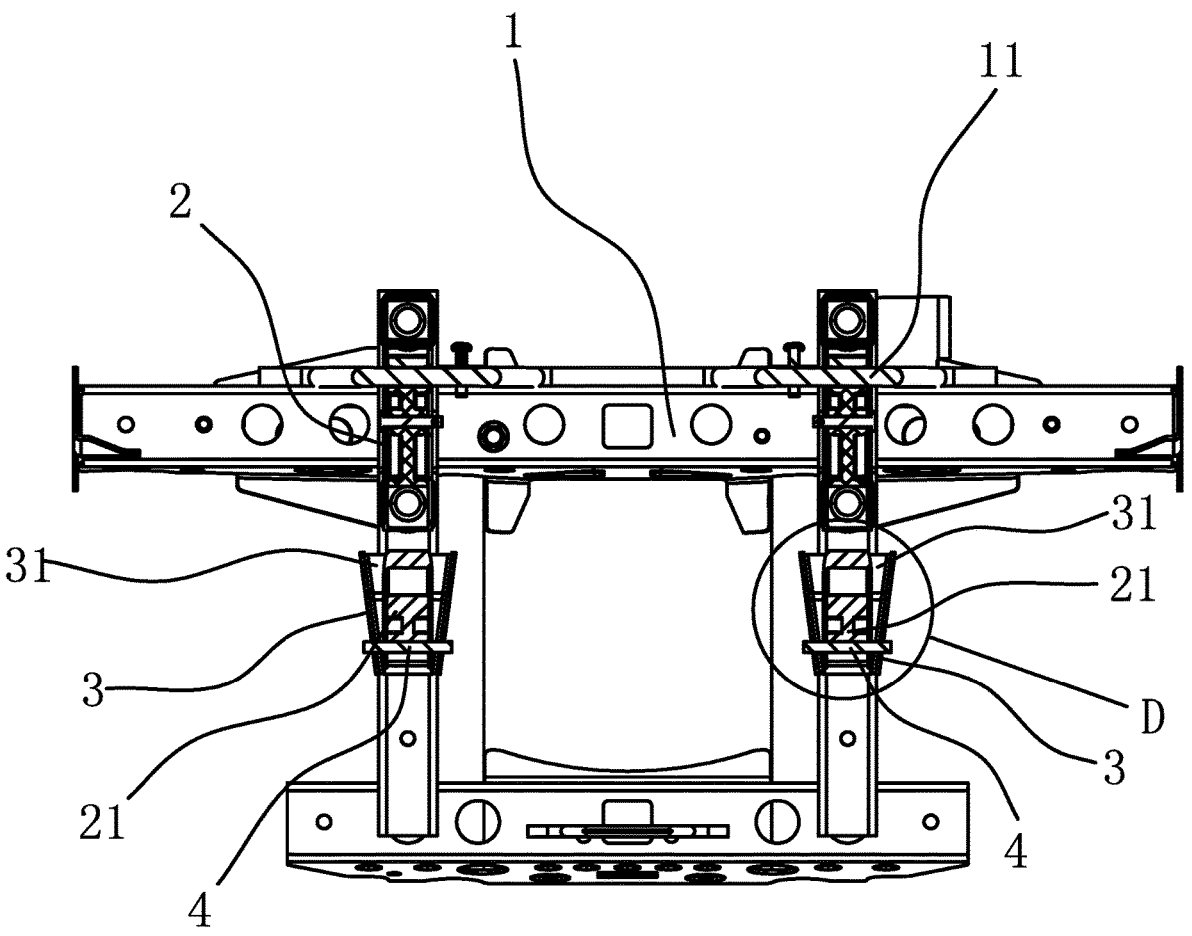
FIG. 3 is a cross-sectional view of A-A in FIG. 2.
Figure 4:
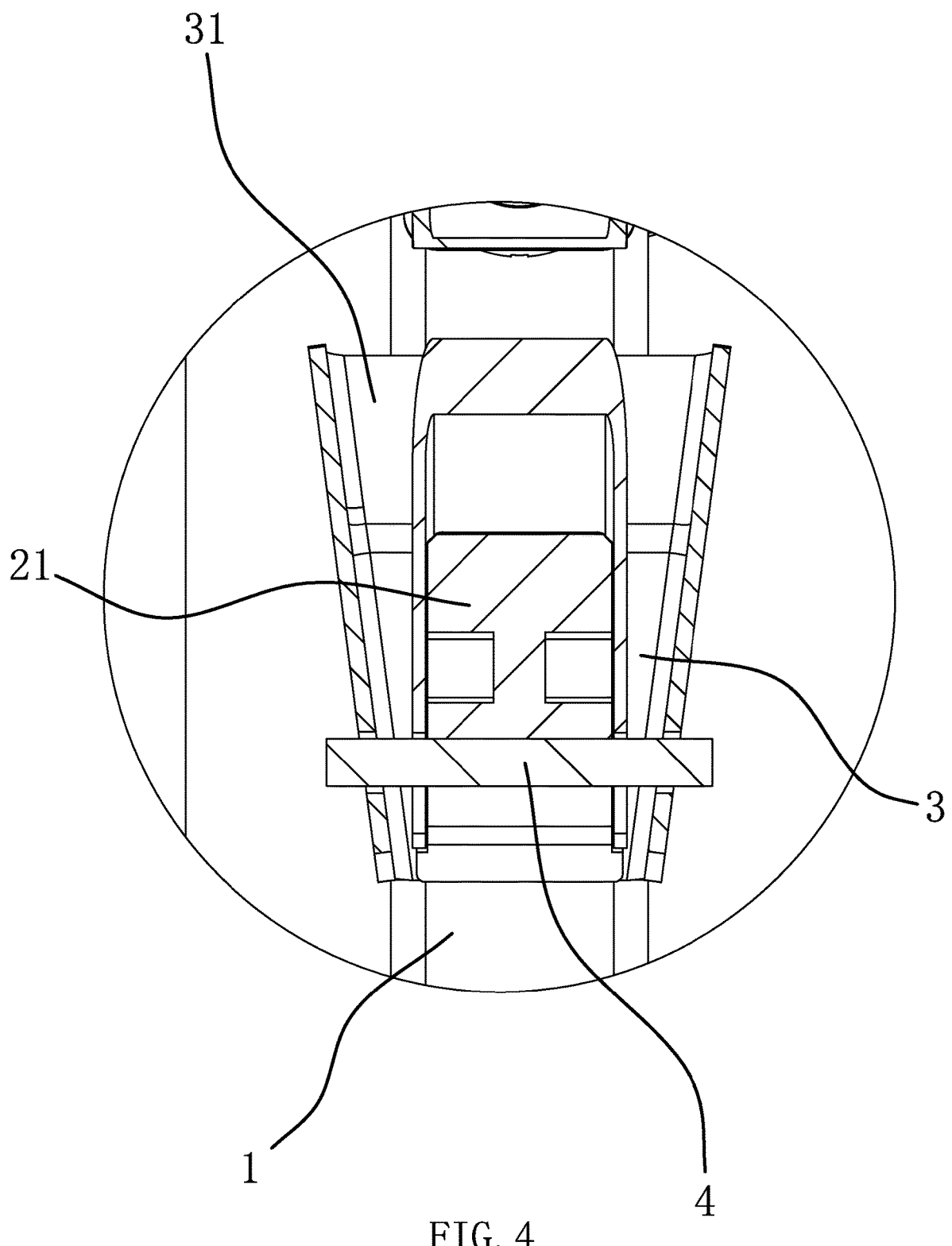
FIG. 4 is an enlarged view of part D in FIG. 3.

As shown in FIG. 3 and FIG. 4, a socket 31 is provided at a rear side of the guide carrier 3, the insertion rod front end of the at least one insertion rod 21 is inserted into the guide carrier 3 from the socket 31, left and right side walls of the guide carrier 3 are arranged obliquely from front to rear outwardly, and left and right sides of the insertion rod front end of the at least one insertion rod 21 are limited by the left and right side walls of the guide carrier 3. In this way, it is conducive to increasing a width range of the socket 31 at a rear end of the guide carrier 3, increasing a probability of the operator in manipulating insertion of the at least one insertion rod 21 into the guide carrier 3, and improving the convenience and precision of mounting, and the insertion rod front end of the at least one insertion rod 21 is in place precisely by being guided by the left and right side walls of the guide carrier 3 during an insertion process.

Figure 5:
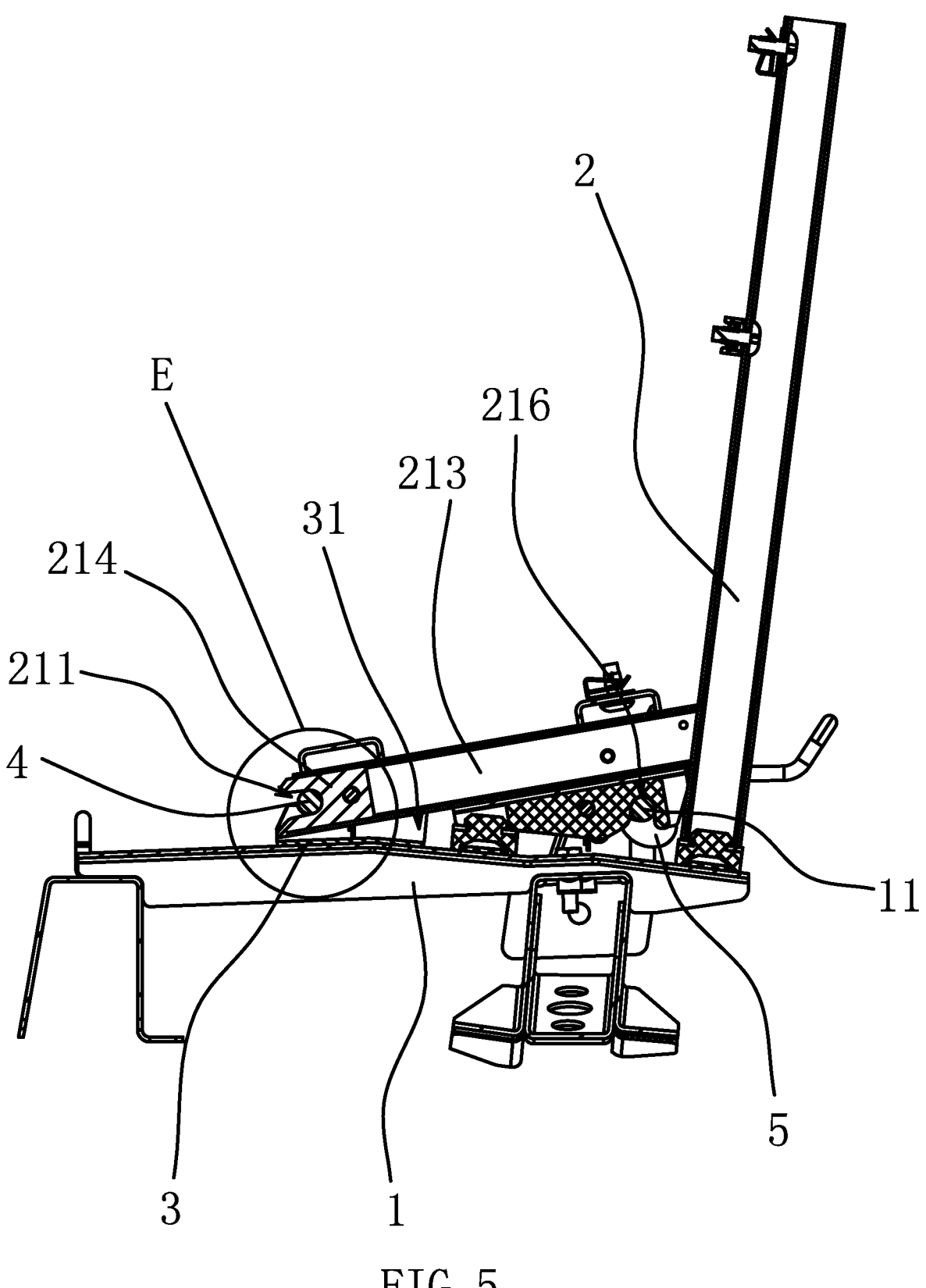
FIG. 5 is a cross-sectional view of B-B in FIG. 2.
Figure 6:
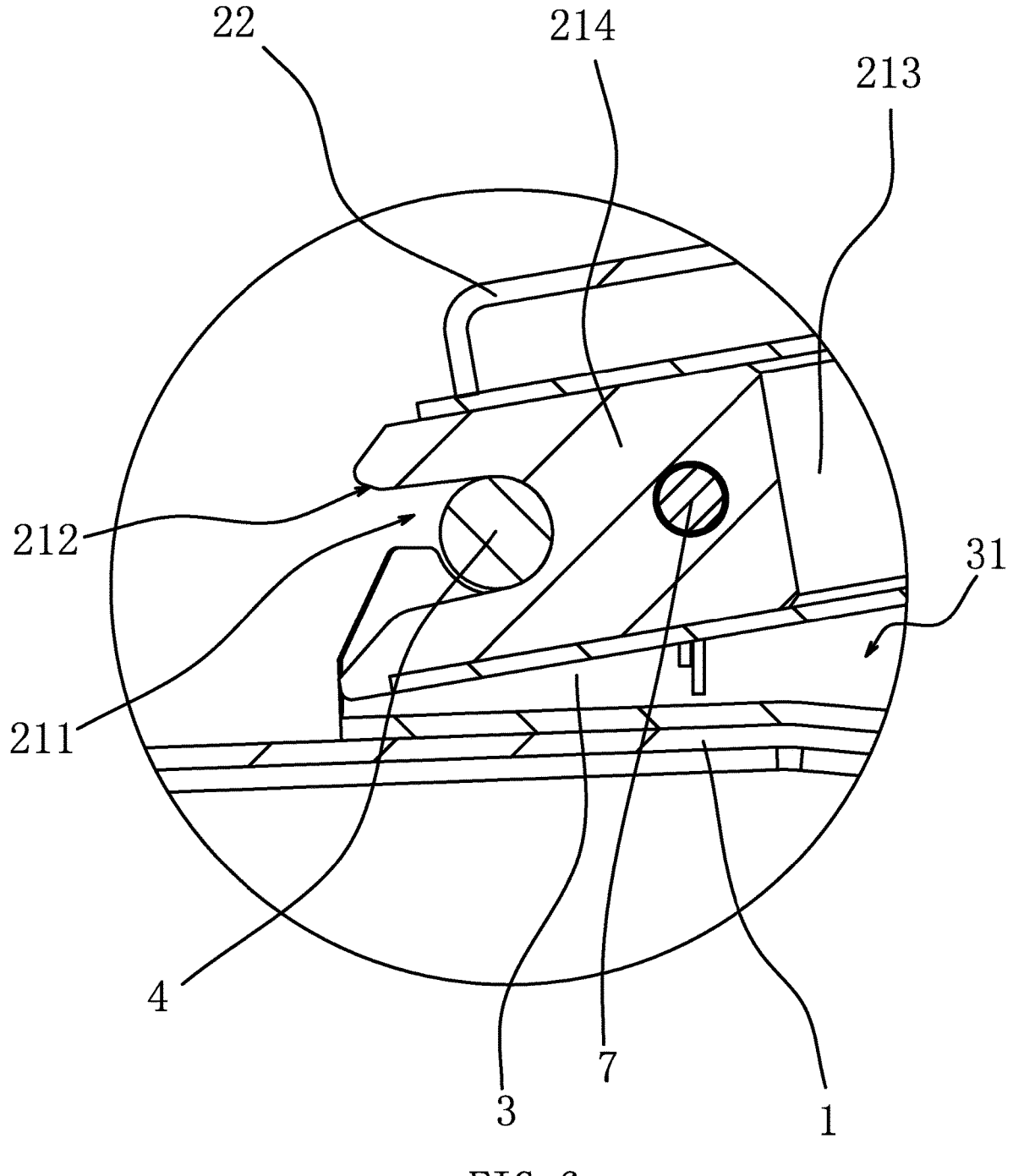
FIG. 6 is an enlarged view of part E in FIG. 5.

As shown in FIG. 5 and FIG. 6, a front end face of the at least one insertion rod 21 has a positioning recess 211 that extends through both left and right sides of the at least one insertion rod 21 and allows embedding of the positioning shaft 4 within the positioning recess 211 to achieve engagement. Engagement of the insertion rod front end of the at least one insertion rod 21 can also be in other forms such as engagement between a rotating shaft provided in the left-and-right direction of the at least one insertion rod 21 and a notch on the guide carrier 3. A bottom face of the at least one insertion rod 21 is disposed to be spaced apart from a bottom surface of an internal cavity of the guide carrier 3, and a guide surface 212 is provided in an upper edge of the positioning recess 211 capable of guiding the positioning shaft 4 to slide into the positioning recess 211, and the guide surface 212 can be an inclined plane. With the positioning recess 211 on the front end face of the at least one insertion rod 21 being positioned and fitted in a vertical direction with the positioning shaft 4, the bottom face of the at least one insertion rod 21 being disposed to be spaced apart from the bottom surface of the internal cavity of the guide carrier 3, and the guide surface 212 being provided in the upper edge of the positioning recess 211, when the seat frame 2 is mounted, during a process of inserting the downwardly-facing insertion rod front end of the at least one insertion rod 21 into the guide carrier 3 from rear to front, the insertion rod front end of the at least one insertion rod 21 is capable of sliding forward along the bottom surface of the internal cavity of the guide carrier 3, and the guide surface 212 is capable of abutting against the positioning shaft 4 when the least one insertion rod 21 is blocked after sliding to reach a position of the positioning shaft 4. At this time, the operator can press the insertion rod rear end of the at least one insertion rod 21 downward and at the same time apply force to push the seat frame 2 forward, the insertion rod front end of the at least one insertion rod 21 is lifted up under an action of the guide surface 212, so that the positioning shaft 4 fits into the positioning recess 211 and cannot be pushed further. At the same time, the insertion rod rear end of the at least one insertion rod 21 is pressed downward to be in place to achieve precise engagement between a rear end of the seat frame 2 and the vehicle frame 1. During a mounting process, the operator is capable of precisely judging the insertion rod front end of the at least one insertion rod 21 being in place after feeling a sliding resistance at the insertion rod front end of the at least one insertion rod 21 and then feeling the insertion rod front end of the at least one insertion rod 21 being lifted up, and then pressing the insertion rod rear end of the at least one insertion rod 21 downward to achieve engagement, thereby ensuring precise mounting and avoiding misjudgment caused by visual blind spots. The socket 31 is provided with an internal cavity having a bottom surface inclined downwardly from front to rear, it further increases a probability of inserting the insertion rod front end of the at least one insertion rod 21 into the guide carrier 3 and improves the convenience of mounting.

Specifically, the at least one insertion rod 21 comprises a tubular body 213 provided in the front-and-rear direction and a positioning block 214 connected within a tubular body front end of the tubular body 213 through a shaft pin 7 disposed transversely in the left-and-right direction, and the positioning recess 211 is located on the positioning block 214. The positioning block 214 is inserted into the tubular body front end of the tubular body 213, the shaft pin 7 penetrates through the positioning block 214, two ends of the shaft pin 7 are respectively inserted into a left side wall and a right side wall of the tubular body 213, and the shaft pin 7 is positioned by lock pins that are penetrated at the two ends of the shaft pin 7 after the two ends of the shaft pin 7 protrude from the tubular body 213. When the positioning block 214 needs to be disassembled, the lock pins are removed from the shaft pin 7, the shaft pin 7 is pulled out from the tubular body 213, and the positioning block 214 is removed from the tubular body front end of the tubular body 213. In this way, the detachable positioning block 214 can cooperate with the positioning shaft 4 during a mounting process, which is conducive to improving a strength at a fitting position and reducing a cost of subsequent replacement and maintenance. As shown in FIG. 6, a positioning block front end of the positioning block 214 protrudes from the tubular body 213, a lower edge of the positioning block front end of the positioning block 214 is flush with a lower edge of the tubular body front end of the tubular body 213, and the lower edge of the positioning block front end of the positioning block 214 is rounded. The lower edge of the positioning block front end of the positioning block 214 can also protrude beyond the lower edge of the tubular body front end of the tubular body 213 downwardly. In this way, the lower edge of the positioning block front end of the positioning block 214 is capable of sliding relative to an inner wall of the guide carrier 3 in order to reduce scratches and prevent the tubular body 213 from being damaged, and at the same time reduce a resistance during mounting, making mounting convenient. As shown in a structure on a right side of FIG. 5, a bottom of the at least one insertion rod 21 has an accommodating recess 216 with a downward-facing mouth, so that the locking rod 11 is embedded in the accommodating recess 216 and is limited in the front-and-rear direction by engagement with inner walls of the accommodating recess 216. In this way, the accommodating recess 216 is capable of limiting relative positions of the seat frame 2 and the locking rod 11, and ensuring a stable mounting effect. At the same time, the accommodating recess 216 can further be used as a standard for checking whether a position of the at least one insertion rod 21 is in place, that is, after the insertion rod front end of the at least one insertion rod 21 is fitted in place, the at least one insertion rod 21 can then be pressed downward to engage the locking rod 11 into the accommodating recess 216, which is conducive to ensuring precise mounting.

Figure 7:
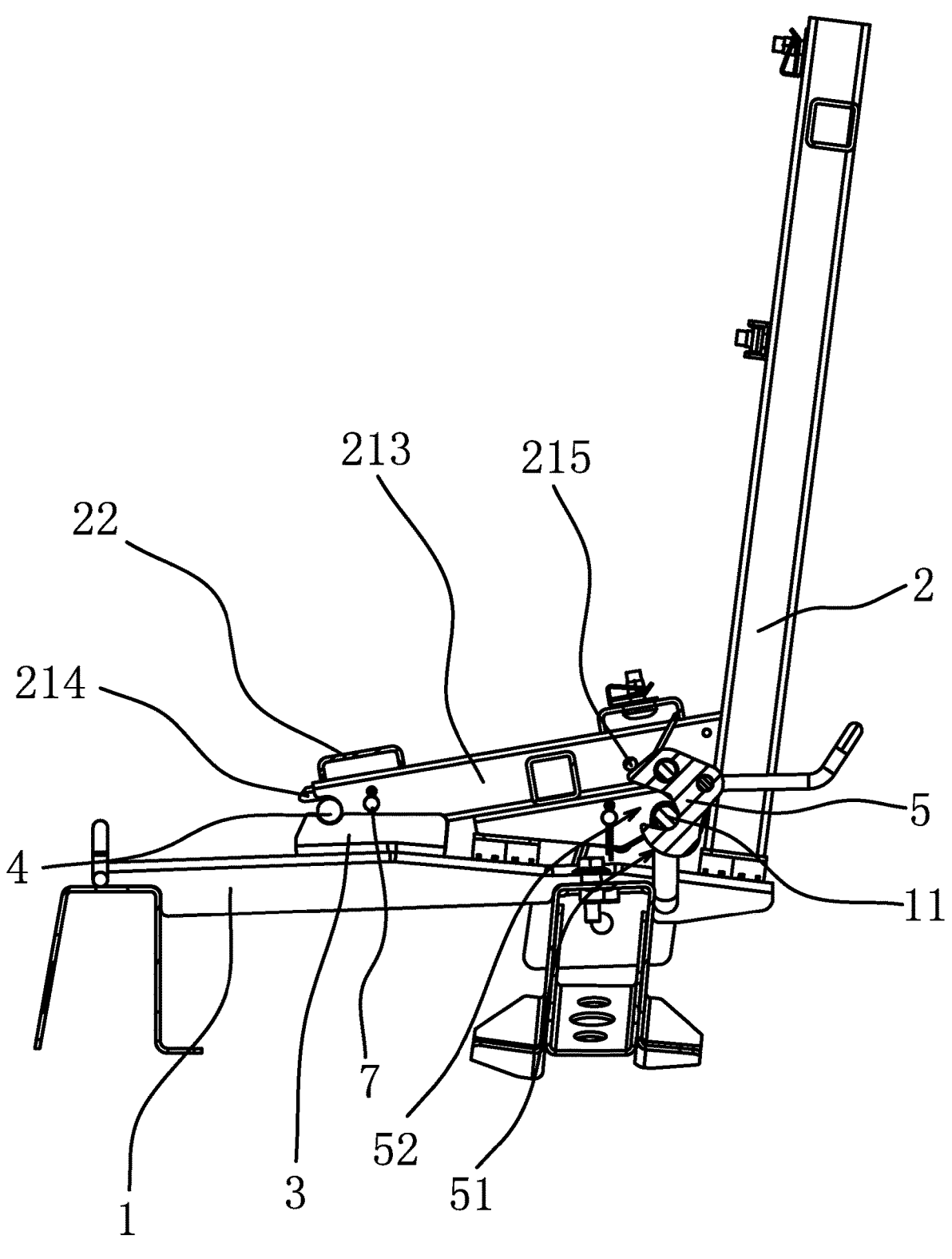
FIG. 7 is a cross-sectional view of C-C in FIG. 2.

As shown in FIG. 7, a locking hook 5 is connected to the at least one insertion rod 21 and capable of swinging in the front-and-rear direction, the locking hook 5 is hinged on the insertion rod rear end of the at least one insertion rod 21 through a pintle, and an opening 52 of the locking hook 5 faces forward. The locking hook 5 is hooked to the locking rod 11 and is limited in a vertical direction by engagement with a lower side of the locking rod 11. In this way, the insertion rod rear end of the at least one insertion rod 21 is in snap-fitting engagement with the locking rod 11 of the vehicle frame 1 through the locking hook 5. During mounting, the operator manipulates the locking hook 5 to swing to realize engagement and dismounting, thereby ensuring a position of the seat frame 2 stable and convenient operation. The locking hook 5 has an arc surface 51 extending from a bottom of the locking hook 5 up to the opening 52 of the locking hook 5, and the at least one insertion rod 21 has a position limiter 215 capable of abutting against the locking hook 5 to prevent the locking hook 5 from further swinging and to keep the bottom of the locking hook 5 facing downward. In this way, during a mounting process of pressing the insertion rod rear end of the at least one insertion rod 21 downward, the locking hook 5 has not been fitted with the locking rod 11 and abuts against the position limiter 215. At this time, when the locking hook 5 descends with the insertion rod rear end of the at least one insertion rod 21 to abut against the locking rod 11, the locking rod 11 is capable of sliding along the arc surface 51 and finally engaging into the opening 52 of the locking hook 5, the whole process does not need to actively manipulate the locking hook 5 to swing, which makes mounting more convenient.

Figure 8:
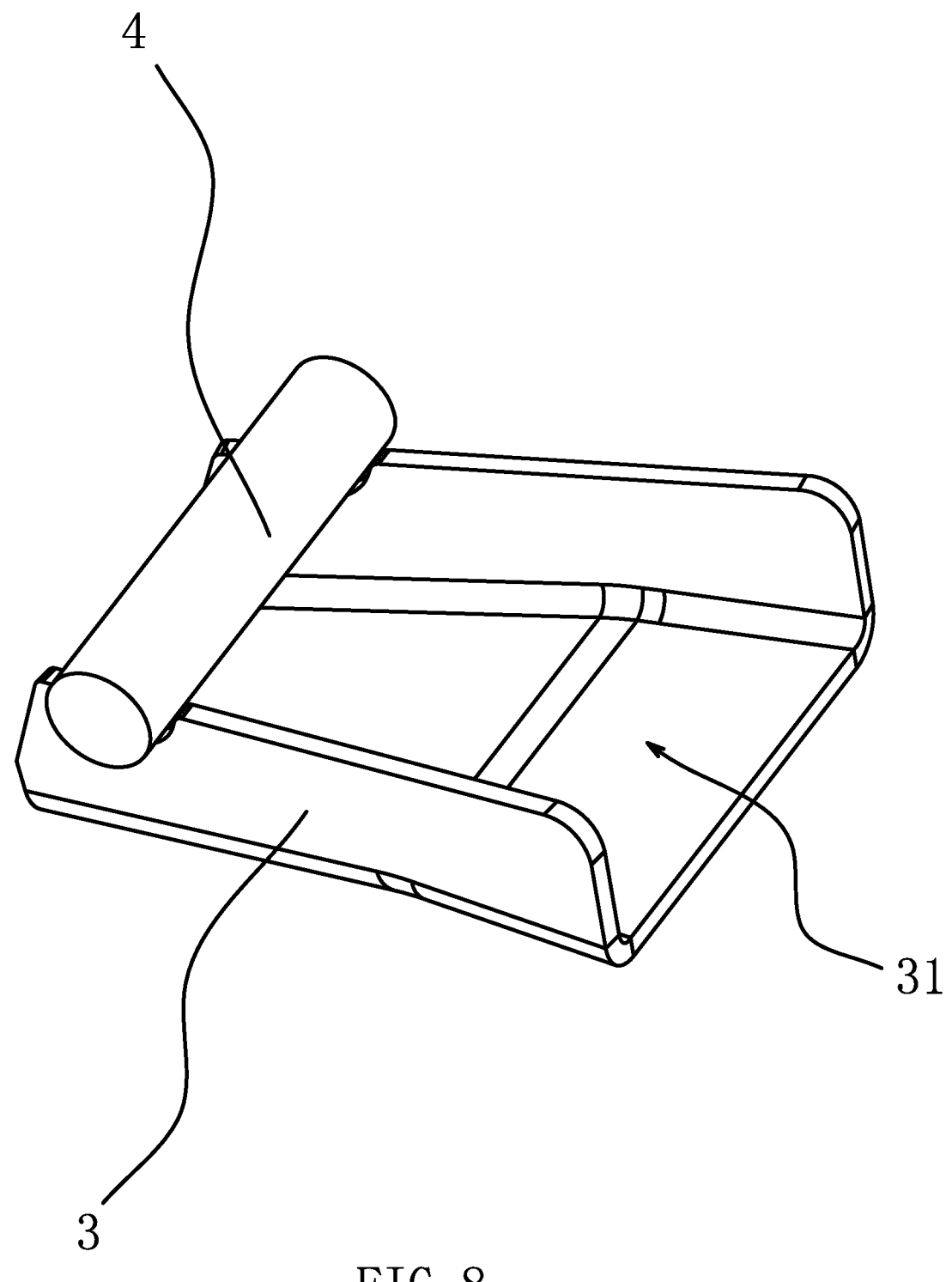
FIG. 8 is a perspective view of a guide carrier and a positioning shaft of one embodiment of the mounting structure of a seat for an all terrain vehicle.

As shown in FIG. 8, the guide carrier 3 is U-shaped with an opening at top.

Figure 9:
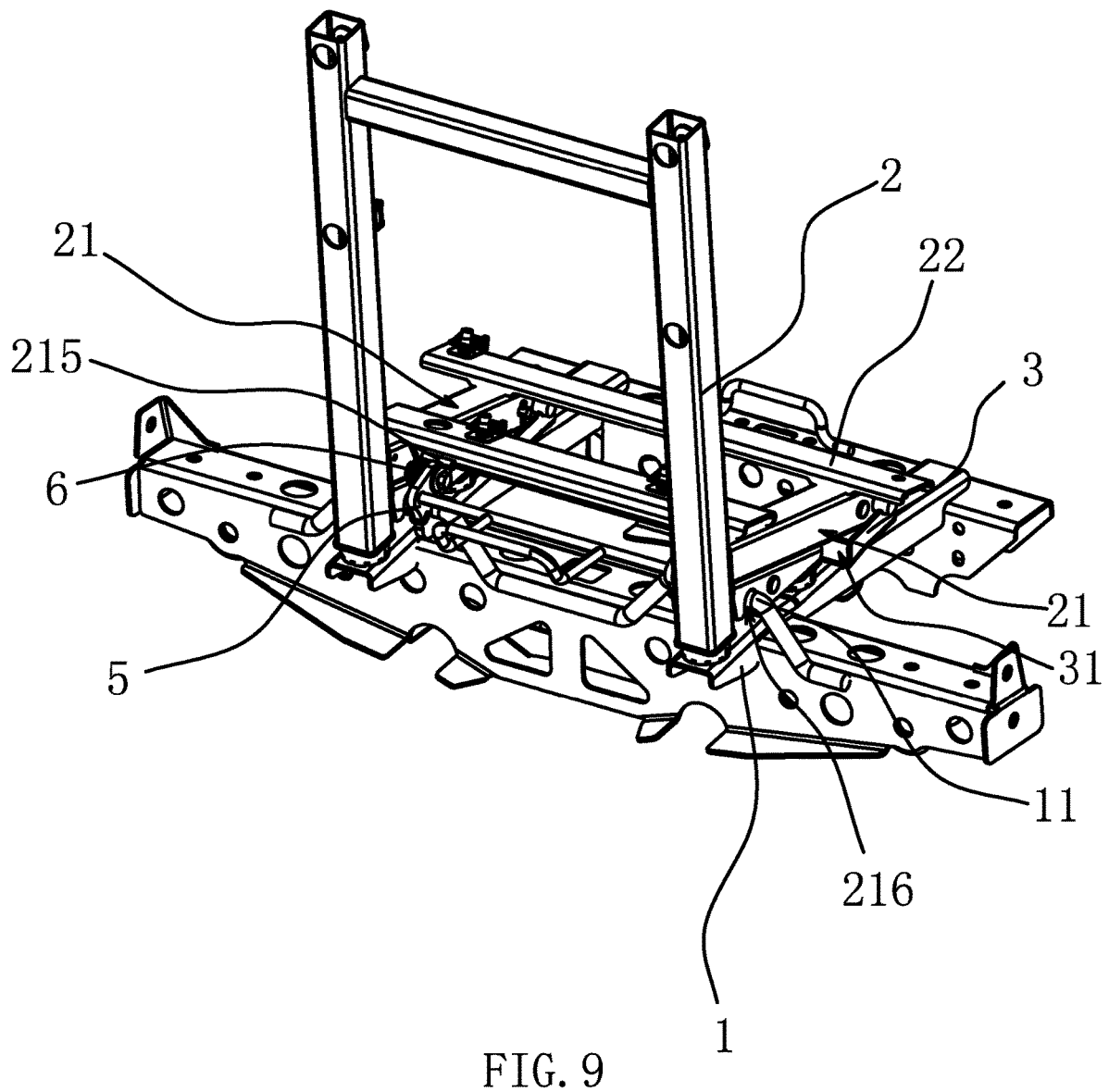
FIG. 9 is a second perspective view of one embodiment of the mounting structure of a seat for an all terrain vehicle.

As shown in FIG. 9, a spring element 6 is provided between the locking hook 5 and the at least one insertion rod 21. The spring element 6 in this embodiment is a torsion spring, and the torsion spring is sleeved on the pintle between the locking hook 5 and the at least one insertion rod 21. One end of the torsion spring is fixed on the at least one insertion rod 21, and another end of the torsion spring is fixed on the locking hook 5. The spring element 6 can also be an extension spring, one end of the extension spring is fixed on the at least one insertion rod 21, and another end of the extension spring is fixed on the locking hook 5. The locking hook 5 always has a tendency to swing under an action of the spring element 6 towards a side to which the opening 52 of the locking hook 5 is directed. In this way, after the locking rod 11 is fitted in the locking hook 5, the locking hook 5 is capable of resetting itself and maintaining a stable locking relationship with the locking rod 11, which improves the convenience of mounting.

The specific embodiments described herein are merely illustrative of the spirit of the invention. Technicians skilled in the art to which the invention pertains can make various modifications or additions to the specific embodiments described or replace them in a similar manner, without departing from the spirit of the invention or beyond the scope defined by the appended claims.

LIST OF REFERENCED PARTS 1 vehicle frame
11 locking rod 2 seat frame
21 at least one insertion rod
211 positioning recess
212 guide surface
213 tubular body
214 positioning block
215 position limiter
216 accommodating recess
22 connecting rod
3 guide carrier
31 socket
4 positioning shaft
5 locking hook
51 arc surface
52 opening
6 spring element
7 shaft pin

What is claimed is:

1. A mounting structure of a seat for an all terrain vehicle with a vehicle frame and a seat frame, the mounting structure comprising:

at least one insertion rod provided at a bottom of the seat frame in a front-and-rear direction, with an insertion rod rear end of the at least one insertion rod being in snap-fitting engagement with the vehicle frame, wherein the mounting structure further comprises a guide carrier fixedly provided on the vehicle frame and having a socket at a rear side of the guide carrier capable of inserting an insertion rod front end of the at least one insertion rod, with a width of the socket in a left-and-right direction gradually increasing in a front-to-rear direction, so that the insertion rod front end is positioned in an up-and-down direction by snap-fitting engagement into the guide carrier and limited in the left-and-right direction by engagement between inner walls of the guide carrier; and wherein the guide carrier is U-shaped with an opening at a top of the guide carrier, at least two of the at least one insertion rod are provided and arranged parallel to each other in the left-and-right direction, and the mounting structure further comprises a connecting rod provided transversely on the seat frame in the left-and-right direction, the connecting rod being simultaneously and fixedly connected to a top of the insertion rod front end.

2. The mounting structure of a seat for an all terrain vehicle as claimed in claim 1, wherein the socket is provided with an internal cavity having a bottom surface inclined downwardly in the front-to-rear direction.

3. The mounting structure of a seat for an all terrain vehicle as claimed in claim 1, wherein a positioning shaft is provided transversely in the left-and-right direction and connected to the guide carrier, an insertion rod front end face of the at least one insertion rod has a positioning recess that extends through both left and right sides of the at least one insertion rod and allows embedding of the positioning shaft within the positioning recess, a bottom face of the at least one insertion rod is disposed to be spaced apart from a bottom surface of an internal cavity of the guide carrier, and a guide surface is provided along an upper edge of the positioning recess capable of guiding the positioning shaft to slide into the positioning recess.

4. The mounting structure of a seat for an all terrain vehicle as claimed in claim 3, wherein the at least one insertion rod comprises a tubular body provided along the front-and-rear direction and a positioning block detachably connected within a tubular body front end of the tubular body, the positioning recess being located on the positioning block.

5. The mounting structure of a seat for an all terrain vehicle as claimed in claim 4, wherein a positioning block front end of the positioning block protrudes beyond the tubular body, while a lower edge of the positioning block front end either protrudes beyond a lower edge of the tubular body front end or is flush with the lower edge of the tubular body front end, the lower edge of the positioning block front end being rounded.

6. The mounting structure of a seat for an all terrain vehicle as claimed in claim 1, wherein the mounting structure further comprises: a locking rod provided transversely on the vehicle frame in the left-and-right direction, and a locking hook connected to the at least one insertion rod and capable of swinging in the front-and-rear direction, the locking hook being hooked to the locking rod and being limited in a vertical direction by engagement with a lower side of the locking rod.

7. The mounting structure of a seat for an all terrain vehicle as claimed in claim 6, wherein a spring element is provided between the locking hook and the at least one insertion rod, so that the locking hook is biased to swing under an action of the spring element towards a side of the hook on which an opening of the locking hook is directed.

8. The mounting structure of a seat for an all terrain vehicle as claimed in claim 6, wherein the locking hook has an arc surface extending from a bottom of the locking hook up to an opening of the locking hook, and the at least one insertion rod has a position limiter capable of abutting against the locking hook to prevent the locking hook from further swinging and to keep the bottom of the locking hook facing downward.

9. The mounting structure of a seat for an all terrain vehicle as claimed in claim 6, wherein a bottom of the at least one insertion rod has an accommodating recess with a downward-facing mouth, so that the locking rod is embedded in the accommodating recess and is limited in the front-and-rear direction by engagement with inner walls of the accommodating recess.

* * * * *